(12) United States Patent
Hafner

(10) Patent No.: US 12,291,353 B2
(45) Date of Patent: May 6, 2025

(54) LAMP FOR A PRECISION APPROACH PATH INDICATOR

(71) Applicant: MONITORX SP. Z O.O., Warsaw (PL)

(72) Inventor: Jan Hafner, Warsaw (PL)

(73) Assignee: MonitorX SP. Z O.O., Warsaw (PL)

( * ) Notice: Subject to any disclaimer, the term of this patent is extended or adjusted under 35 U.S.C. 154(b) by 0 days.

(21) Appl. No.: 18/294,695

(22) PCT Filed: Aug. 4, 2021

(86) PCT No.: PCT/IB2021/057124
§ 371 (c)(1),
(2) Date: Feb. 2, 2024

(87) PCT Pub. No.: WO2022/130037
PCT Pub. Date: Jun. 23, 2022

(65) Prior Publication Data
US 2025/0100713 A1    Mar. 27, 2025

(51) Int. Cl.
*B64F 1/00* (2024.01)
*B64F 1/20* (2006.01)

(52) U.S. Cl.
CPC ..................... *B64F 1/20* (2013.01)

(58) Field of Classification Search
CPC ....................................... B64F 1/20
See application file for complete search history.

(56) References Cited

U.S. PATENT DOCUMENTS

| | | | | |
|---|---|---|---|---|
| 5,287,104 A * | 2/1994 | Shemwell | ........... | G08G 5/54 340/555 |
| 8,434,905 B2 * | 5/2013 | Tian | ........... | B64F 1/20 362/249.02 |
| 9,505,501 B2 * | 11/2016 | Bertin | ........... | B64F 1/20 |
| 2006/0083017 A1 * | 4/2006 | Wang | ........... | F21V 23/0407 362/547 |
| 2010/0123398 A1 * | 5/2010 | Tian | ........... | H05B 45/30 356/138 |

(Continued)

FOREIGN PATENT DOCUMENTS

| CN | 107448784 A | 12/2017 |
|---|---|---|
| EP | 2325085 B1 | 5/2011 |
| EP | 2495169 A2 | 9/2012 |

OTHER PUBLICATIONS

International Search Report dated Jun. 23, 2022 in parent International application PCT/IB2021/057124.

(Continued)

Primary Examiner — Gerald J Sufleta, II
(74) Attorney, Agent, or Firm — Polson Intellectual Property Law P.C.; Margaret Polson; Christopher Sylvain

(57) ABSTRACT

A lamp for a precision approach path indicator comprising at least two radiation sources emitting electromagnetic radiation of different wavelengths, a beam of radiation of a first wavelength and a beam of radiation of a second wavelength, and a partition for separating the beam of radiation of the first wavelength from the beam of radiation of the second wavelength. The lamp is further provided with an offsetting element that offsets at least one of the beams essentially towards the other of the beams by a width to compensate for the obstruction created by the partition.

7 Claims, 3 Drawing Sheets

(56) References Cited

U.S. PATENT DOCUMENTS

| | | | | |
|---|---|---|---|---|
| 2011/0006920 | A1* | 1/2011 | Bauer | G08G 5/22 |
| | | | | 340/972 |
| 2011/0285294 | A1* | 11/2011 | Hansler | B64F 1/20 |
| | | | | 257/89 |
| 2012/0007979 | A1* | 1/2012 | Schneider | G01J 3/36 |
| | | | | 348/116 |
| 2012/0223255 | A1* | 9/2012 | Walker | B64F 1/20 |
| | | | | 362/555 |
| 2014/0071441 | A1* | 3/2014 | Ruknudeen | G01B 11/26 |
| | | | | 356/139.1 |
| 2018/0159303 | A1* | 6/2018 | Kim | F21V 5/043 |
| 2018/0273205 | A1* | 9/2018 | Laakso | F21V 7/0008 |
| 2021/0394926 | A1* | 12/2021 | Mizobe | B64D 45/08 |
| 2021/0403178 | A1* | 12/2021 | Ellerton | F21V 7/05 |

OTHER PUBLICATIONS

Written Opinion of the International Searching Authority dated Jun. 23, 2022 in parent International application PCT/IB2021/057124.

\* cited by examiner

LAMP FOR A PRECISION APPROACH PATH INDICATOR

FIELD

This disclosure relates to a lamp for a precision approach path indicator. It finds application in airfield lighting systems for approach and navigation during the final stage of descent of an airplane to a runway, to aid pilots in the precision approach and to keep an airplane on a correct glide path. The disclosure belongs to the field of lightings used on airplane runways as a visual navigation aid for a pilot.

BACKGROUND

A precision approach path indicator (PAPI) is a key part of airfield ground lightning systems used at airports. It provides guidance information to help a pilot acquire and maintain the correct approach and land the airplane safely. A PAPI warns pilot about too high or too low approach in relation to the ground. Typically, a PAPI system comprises four units that are positioned in a row at the side of the runway. The units are equally spaced, and each unit transmits a color-coded light output, typically white and red. The color-coded light output provides a visual indication of an aircraft's approach position relative to the designated glide slope for the runway heading. When an aircraft approaches the runway, the angle of its approach determines whether the light beams appear red or white to the pilot. If the aircraft is approaching on the correct glide path, the four light PAPI system will show two red lights and two white lights. If the position of the aircraft is too high, the number of white lights increases. If the position of the aircraft is too low, the number of red lights increases. The guidance of the lights makes it easy for the pilot to adjust the position of the aircraft and land in the designated part of the runway.

An important aspect of PAPI systems is separation of the white light from the red light, so that they do not overlap each other. Traditionally, the separation is made by wall/divider which prevents transmission of light from the red sector to the white sector and vice versa. In order to effectively block unwanted transmission of the red light or white light, the divider may be covered with a layer selective with regard to the transmission of the red/white light. Alternatively, the divider can be made with a very sharp edge.

CN107448784A discloses an optical system comprising a red light LED and a white light LED as light sources, and characterized by an assembly comprising a set of lens-containing red LED and white LED arrays, a set of lenses in two halves, a spacer sandwiched between two halved lenses, and a set of prism assemblies. The lens assembly forms an optical system in which the red light is above and the white light is below after the array of red LEDs and white LEDs passes through the lens. The prism assembly is divided into an upper prism assembly and a lower prism assembly. The center line of the light exit surface of the prism assembly is close to the focal plane of the lens assembly.

In EP2495169A2, there is a PAPI unit comprising first and second light sources and a projection lens assembly, wherein light emitted by the first and second light sources is collected by first and second solid waveguides respectively and is guided by said waveguides to an intermediate plane, said intermediate plane being located in the focal plane of the projection lens assembly.

EP2325085B1 discloses an apparatus, comprising: a first mounting surface for mounting an array of light emitting diodes, the array of light emitting diodes comprising a first set of light emitting diodes emitting a first color and a second set of light emitting diodes emitting a second color; a second mounting surface having a pair of apertures optically coupled with the array of light emitting diodes, the pair of apertures are separated by a precision ground blade, wherein the precision ground blade has a first edge and a second edge, the first edge is closest to the array of light emitting diodes and the second edge is opposite the first edge, the first and second edges having different thicknesses; a third mounting surface having a first lens mounted thereon, the first lens optically coupled with the array of light emitting diodes and receiving light from the array of light emitting diodes; and a front surface having a second lens mounted thereon, the second lens optically coupled with the first lens and receiving light from the first lens.

In U.S. Pat. No. 8,434,905B2, there is provided a LED based PAPI system for guiding a landing aircraft to a pre-determined approach path comprising multiple light housing assemblies (LHAs), each of the LHAs comprising of one or more lighting assembly modules. Each of the lighting assembly modules comprises: an array of white LEDs; an array of red LEDs positioned above said array of white LEDs; a plurality of collimating lens, each being placed in front of each LED of said array of white LEDs and said array of red LEDs; an optical combiner being placed in front of said array of red LEDs and being slightly above a first plane where said array of white LEDs are placed; and a projection lens set which is positioned in front of said optical combiner; wherein said optical combiner is a six face lens comprising an input refractive surface facing said LEDs, an output projection surface facing said projection lens set, a flat top surface, and a flat bottom surface having a reflective coating to block white light and increase white light intensity near transition zone, said output projection surface having a filter coating which is transparent with red light.

SUMMARY

The disclosure provides a lamp for a precision approach path indicator (PAPI) as in the claims.

An advantage of the lamp is ease of production, maintenance and service. In addition, using an offsetting element, the cost of production and installation and setting up of the PAPI systems might be significantly reduced.

BRIEF DESCRIPTION OF THE DRAWINGS

The accompanying drawings incorporated herein and forming a part of the specification illustrate example embodiments, wherein.

DETAILED DESCRIPTION

Figure 1:
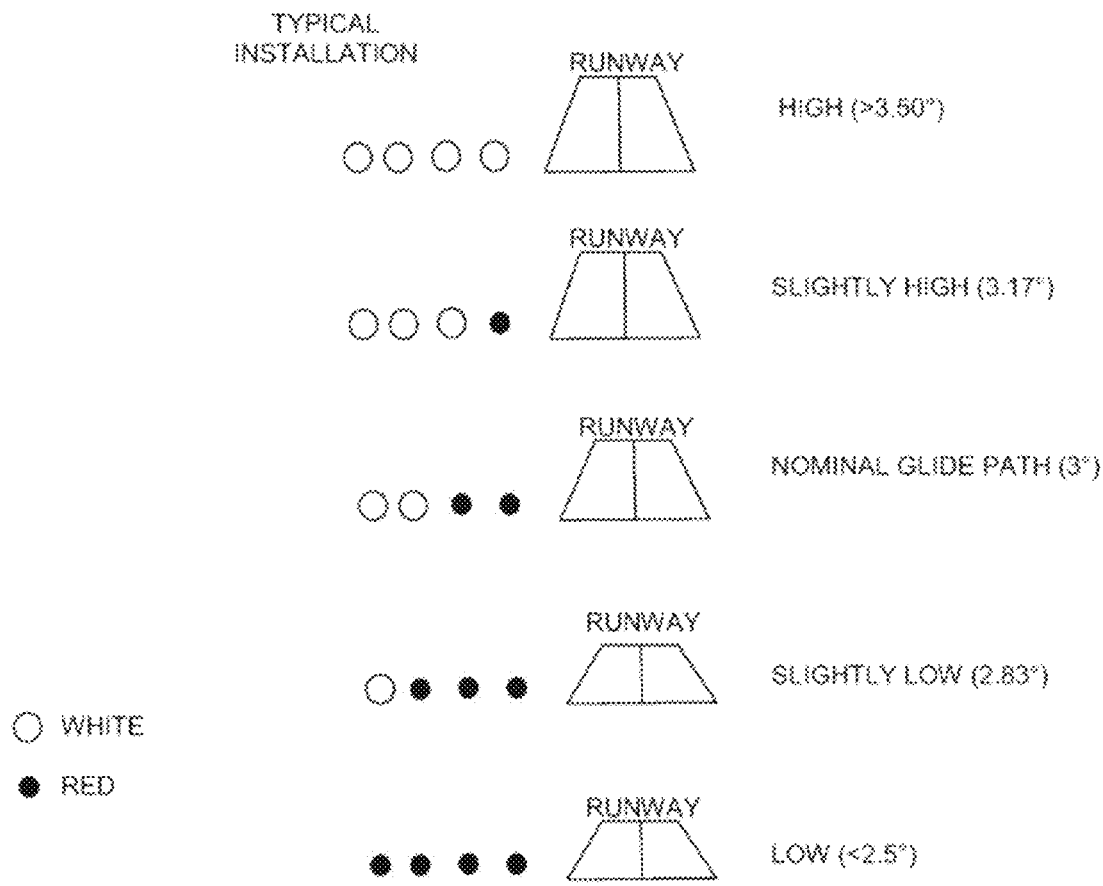
FIG. 1 shows a principle of operation of a PAPI system.

FIG. 1 shows a general principle of the operation of a PAPI system on the basis of a pilot's eye view of such a system. The PAPI system comprises a row of four lighting units installed alongside the runway, each unit can consist of one or more lamps close by. Each of the four lighting units emits a beam of light consisting of white light in the upper part and red light in the lower part, so each beam is split horizontally. Two of the light sources are arranged to transmit at angles slightly greater than the optimal approach angle of the aircraft, and the other two at angles that are slightly smaller than the optimal approach angle. The result is that a pilot approaching the runway on the correct path sees two red lights and two white lights. When the path of the aircraft in relation to the runway is too low, the pilot sees more red lights for example three or four. When the path of the aircraft is too high, the pilot sees three or four white lights.

An optimally working PAPI system should be set up precisely and maintain a clear and sharp color change boundary. This transition zone should be as small as possible in order to give the pilot clear information about the glide path of the aircraft.

Figure 2:
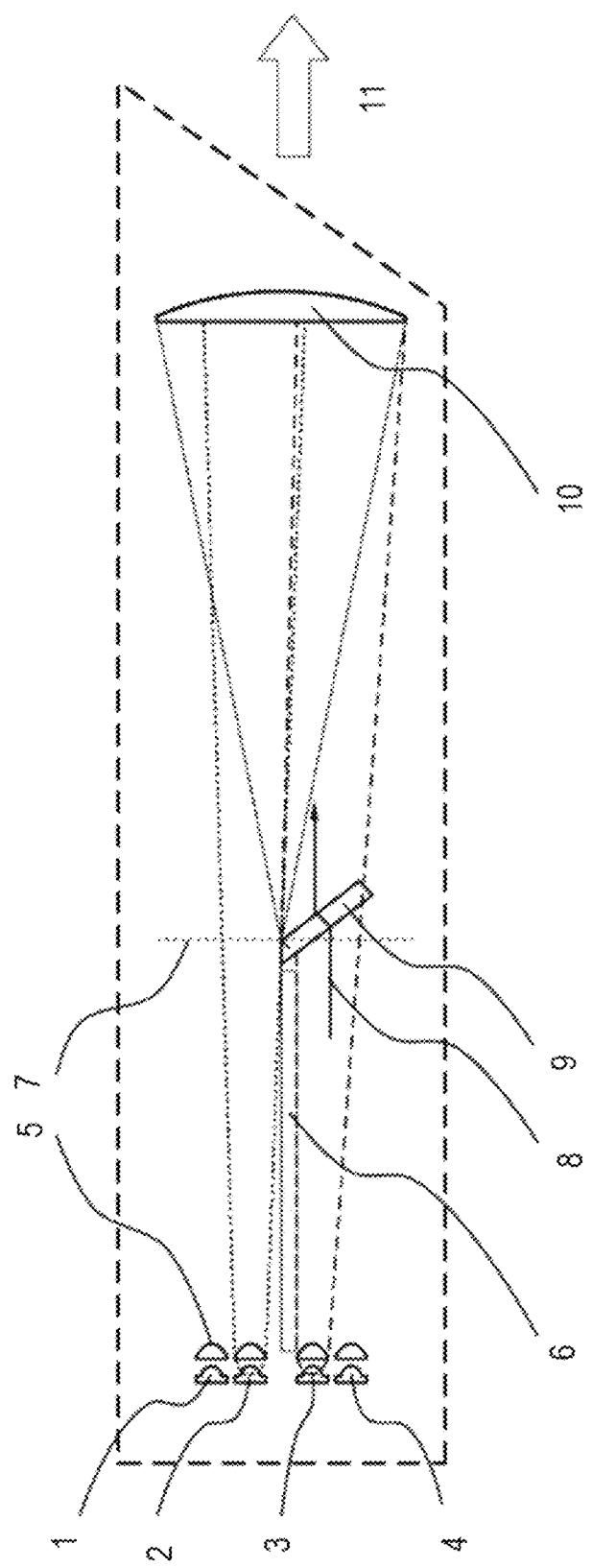
FIG. 2 shows a lamp for precision approach according to the disclosure in a preferred embodiment.
Figure 3:
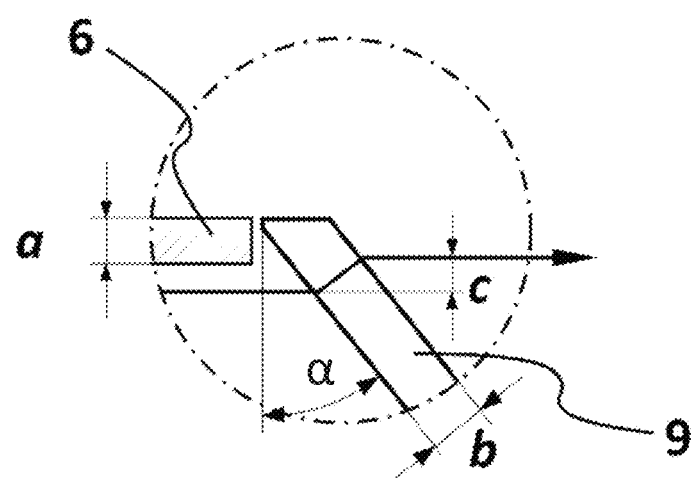
FIG. 3 shows in detail a part of the embodiment of FIG. 2.

FIG. 2 shows a schematic cross section of a lamp according to the disclosure in the preferred embodiment. In this embodiment, the lamp for a precision approach path indicator comprises a number of light sources 1, 2, 3, 4 emitting electromagnetic radiation of different wavelengths, for example white light, red light and infrared radiation. In some embodiments, the lamp can be further provided with at least one, and preferably two, additional radiation sources of a third wavelength.

The radiation from radiation sources 1, 2, 3, 4 is collimated with the optical elements 5 such as lenses or mirrors in such a way that the desired illumination is achieved in the intermediate plane 7. The desired illumination means the illumination pattern appropriate to use as PAPI landing lights as described in relation to FIG. 1 a first beam of light or radiation in the upper section with the sources 1, 2 and a second beam in the lower section with the sources 3, 4. The lamp comprises a partition 6 for separating the first from the second beam, with the partition having a first width a. It is worth noting that the partition as compared to other known systems does not require having a very sharp trailing edge. The lamp comprises an offsetting element 9 that offsets the beam of the light of the second beam in direction essentially vertical towards the first beam while maintaining its essentially horizontal alignment. The beam offset c from the offsetting element 9 is calculated by the law of refraction and depends on a thickness b of the offsetting element 9, an angle α of the offsetting element 9 with respect to the beam direction, and refractive index n of the transparent material used to manufacture the offsetting element 9, where n is a material constant. The gained beam offset c is preferably equal or greater than the first width a of the partition 6. The required beam offset or second width c can be calculated according to the following formula:

$$c = b \sin(\alpha) \left( 1 - \frac{\cos(\alpha)}{\sqrt{n^2 + \sin^2(\alpha)}} \right)$$

where:
b is the width of the offsetting element 9,
α is an angle of the offsetting element 9 with respect to the beam direction, and
n is a refractive index of the material from which the offsetting element 9 is made.

The offsetting element 9 is placed in the second beam and shaped in such a way that it does not affect the direction of the first beam. The offsetting element 9 can have a form of a prism, e.g., glass prism with two parallel first faces. The offsetting element 9 has the width b, and has a second face which is formed so that it does not obstruct the first beam.

When the offsetting element 9 is angled towards the light of the second beam with the sources 3, 4, it creates a light path that is offset by the beam offset c in a direction which compensates for the obstruction created by the partition 6. The subdivided sections from the intermediate image are projected in the approach or in pilot's direction 11 by means of a lens 10.

This results in a device that emits a beam which is split horizontally and consisting of radiation of the first wavelength, e.g., a white light, in the higher section that forms the first beam, and radiation of the second wavelength, e.g., a red light, in the lower section that forms the second beam. The pilot sees either red or white light from one particular lamp module. In case of following the infrared signals with the help of night vision goggles, the pilot can distinguish the two infrared signals by means of the transmitted temporal signal, for instance steady or flashing.

Tilt and position of the offsetting element 9 can be adjusted, and the position of the partition 6 can also be adjusted. The advantageous effect of positioning the two elements 6 and 9 is that the width of a possibly overlapping area of the first light beam and the second light beam can be minimized.

In other embodiments, the offsetting element can be a composite material having at least two layers of materials with a different refraction index n1, n2 of a different thickness b1, b2. In general, the offsetting element 9 can be made of many different layers, each of a different refraction index and thickness.

The formula for calculating the second width c is as follows:

$$c = \sum_{i=1}^{k} b_i \sin(\alpha) \left( 1 - \frac{\cos(\alpha)}{\sqrt{n_i^2 + \sin^2(\alpha)}} \right)$$

where:
$b_i$ is the width of the i-th layer of offsetting element 9,
α is an angle of the offsetting element 9 with respect to the beam direction,
$n_i$ is a refractive index of the material from which the i-th layer of the offsetting element 9 is made, and
k is a number of layers creating the offsetting element.

In yet another embodiment of the lamp, there are two offsetting elements 9 that offset the first and the second beam respectfully. They are placed such that they offset their respective beams towards each other, while each offset partially compensates for the obstruction created by the partition 6.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation may be made by those skilled in the art without departing from the spirit of this invention.

The invention claimed is:

1. A lamp for a precision approach path indicator comprising:
at least two radiation sources emitting electromagnetic radiation of different wavelengths, a beam of radiation of a first wavelength and a beam of radiation of a second wavelength,
a partition for separating the beam of radiation of the first wavelength from the beam of radiation of the second wavelength, the partition having a first width (a), and an offsetting element that offsets at least one of the beams towards the other of the beams by a second width (c) to compensate for the obstruction created by the partition,
wherein the offsetting element is a glass prism with two parallel first faces of a width (b), such that when the offsetting element is angled towards the beam of radiation of the second wavelength, the offsetting element creates a light path that is offset by the first width (a) of the partition, and with at least one second face angled in relation to the parallel first faces, such that when the offsetting element is angled towards the beam of radiation of the second wavelength, the second face is parallel to and below the beam of radiation of the first wavelength.

2. The lamp of claim 1, wherein the second width (c) of the beam offset is calculated according to the formula:

$$c = b \sin(\alpha) \frac{1 - \cos(\alpha)}{\sqrt{n^2 + \sin^2(\alpha)}}$$

where
  (b) is the width of the offsetting element,
  ($\alpha$) is an angle of the offsetting element with respect to the beam direction, and
  (n) is a refractive index of the material from which the offsetting element is made.

3. The lamp of claim 1, wherein the offsetting element is placed and adapted not to affect the direction of the beam of radiation of the first wavelength.

4. The lamp of claim 1, wherein the lamp is provided with at least one additional radiation source of a third wavelength.

5. The lamp of claim 4, wherein the lamp is provided with two additional radiation sources of the third wavelength.

6. The lamp of claim 1, wherein the offsetting element is made of at least two layers of different materials.

7. The lamp of claim 6, wherein the offsetting element is made of at least two layers of different thickness.

* * * * *